E. SMITH.
Insertible Saw-Teeth.

No. 162,319.          Patented April 20, 1875.

WITNESSES:
C. Neveux
A. F. Terry

INVENTOR:
E. Smith
BY
ATTORNEYS.

THE GRAPHIC CO.PHOTO-LITH.39 & 41 PARK PLACE, N.Y.

UNITED STATES PATENT OFFICE.

ERASMUS SMITH, OF NORWICH, NEW YORK.

IMPROVEMENT IN INSERTIBLE SAW-TEETH.

Specification forming part of Letters Patent No. 162,319, dated April 20, 1875; application filed January 18, 1875.

*To all whom it may concern:*

Be it known that I, ERASMUS SMITH, of Norwich, in the county of Chenango and State of New York, have invented a new and useful Improvement in Insertible Saw-Teeth, of which the following is a specification:

The invention will first be fully described, and then pointed out in the claim.

Figure 1:
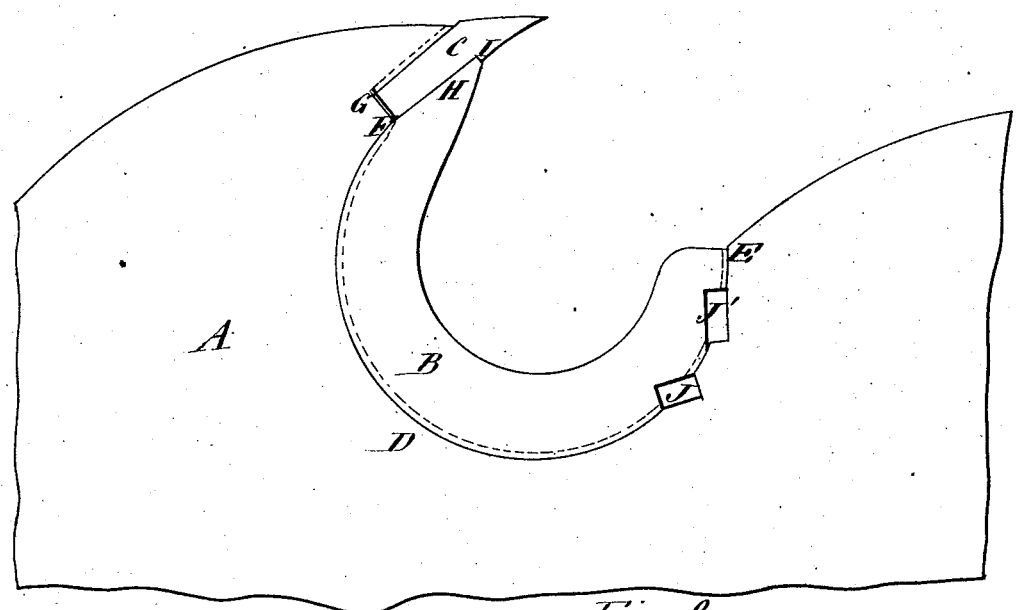
Figure 2:
Figure 3:
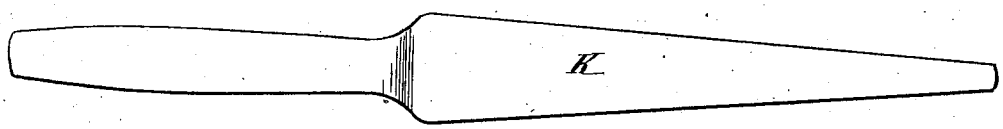
Figure 4:
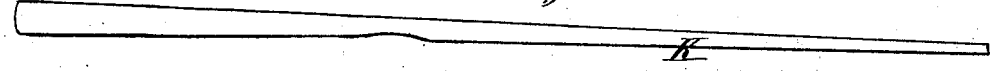

In the drawing, Figure 1 is a side view of a section of the saw-plate, leaving the tooth and wedge attached according to my invention. Fig. 2 is an edge view of the same. Fig. 3 is a side view of the key for loosening the wedge. Fig. 4 is an edge view of the same.

Similar letters of reference indicate corresponding parts.

A is the saw-plate. B is the circular wedge, and C is the saw-teeth. D is a circular opening in the saw-plate, (extending from E to F,) the edge of which is made V-shaped, substantially as seen in Fig. 2. From the point F the wedge B extends to near the circumference of the saw-plate in a straight line. G is an offset in the plate, sufficient for the width of the tooth C, from which the opening for the tooth extends to the outer circumference of the plate, having its edge in the V-form. The back edge of the tooth is fitted to this V, and its sides are thereby kept flush with the plate, and the tooth is held in position. The edge of the circular wedge is also ground to fit the V of the plate, the wedge being closely fitted to the opening D. The groove in the wedge and in the back edge of the tooth is indicated by dotted lines. The opening D is a true circle, and the wedge will move downward with the tooth when the point of the latter meets resistance, and the straight portion H will press upon the tooth and hold it tightly against the V-shaped edge of the opening G. The tooth is therefore self-fastening in the plate. I is a projection or shoulder on the tooth, which bears on the point of the wedge, and presses the latter down when the tooth is cutting, and prevents the saw-dust from getting behind or wearing it. J J' are openings cut diagonally, partly in the saw-plate and partly in the wedge. By the insertion of a key, K, (see Figs. 3 and 4,) the wedge is thrown in either direction. By the use of the key in the opening J the wedge is thrown upward toward the tooth, which loosens the tooth, and by using the key in the opening J', the wedge is thrown in the other direction and the tooth is tightened. These teeth are readily taken out and put in. To give the saw the proper set, the teeth may be removed and the points spread in a die and made uniform, instead of being spread when in the saw by the uncertain blows of a hammer. The straight portion of the wedge binds the tooth, and this wedge is all that is required for fastening it.

Having thus described my invention, I claim as new and desire to secure by Letters Patent—

The saw-plate A and tooth-wedge B, provided with openings J J', arranged with the joint of wedge and plate diagonally, one portion in the wedge and the other in the plate, to allow the said wedge to be tightened against or loosened from the tooth by keys, in the manner specified.

ERASMUS SMITH.

Witnesses:
WM. H. GUNN,
THOMAS H. LEWIS.